(12) United States Patent
Albert et al.

(10) Patent No.: US 11,981,303 B2
(45) Date of Patent: May 14, 2024

(54) VEHICLE BRAKING SYSTEM AND METHOD OF OPERATING THE SAME

(71) Applicant: Robert Bosch GmbH, Stuttgart (DE)

(72) Inventors: Timothy J. Albert, West Bloomfield, MI (US); Ryan A. Kuhlman, Pinckney, MI (US); James Timpa, Howell, MI (US); Robin Raumer, Plymouth, MI (US)

(73) Assignee: Robert Bosch GmbH, Stuttgart (DE)

( * ) Notice: Subject to any disclaimer, the term of this patent is extended or adjusted under 35 U.S.C. 154(b) by 916 days.

(21) Appl. No.: 16/999,944

(22) Filed: Aug. 21, 2020

(65) Prior Publication Data

US 2022/0055591 A1 Feb. 24, 2022

(51) Int. Cl.
*B60T 13/74* (2006.01)
*B60T 7/04* (2006.01)
*B60T 13/14* (2006.01)
*B60T 13/68* (2006.01)

(52) U.S. Cl.
CPC ............ *B60T 13/142* (2013.01); *B60T 7/042* (2013.01); *B60T 13/686* (2013.01); *B60T 13/745* (2013.01); *B60T 2220/04* (2013.01); *B60T 2270/82* (2013.01)

(58) Field of Classification Search
CPC .... B60T 13/686; B60T 13/745; B60T 8/4086; B60T 7/042; B60T 2220/04; B60T 2270/82; B60T 13/142
See application file for complete search history.

(56) References Cited

U.S. PATENT DOCUMENTS

| | | | |
|---|---|---|---|
| 5,141,296 A | 8/1992 | Arikawa | |
| 6,450,591 B1* | 9/2002 | Kawahata | B60T 8/3655 303/122.05 |
| 6,494,546 B1 | 12/2002 | Feigel | |
| 7,309,112 B2 | 12/2007 | Isono | |
| 7,673,948 B2 | 3/2010 | Otomo | |
| 8,424,976 B2 | 4/2013 | Dinkel et al. | |
| 8,672,419 B2* | 3/2014 | Miyazaki | B60T 8/344 303/113.1 |
| 8,827,379 B2* | 9/2014 | Nakata | B60T 8/4081 303/122.09 |
| 9,061,669 B2* | 6/2015 | Miyazaki | B60T 13/586 |
| 9,346,443 B2* | 5/2016 | Koo | B60T 13/146 |
| 9,776,605 B2* | 10/2017 | Miyazaki | B60T 8/4081 |

(Continued)

*Primary Examiner* — Bradley T King
(74) *Attorney, Agent, or Firm* — Michael Best & Friedrich LLP

(57) ABSTRACT

A vehicle braking system includes a first wheel cylinder, a second wheel cylinder, a master cylinder including a first master cylinder chamber in fluid communication with the first wheel cylinder via a first circuit and a second master cylinder chamber in fluid communication with the second wheel cylinder via a second circuit, and an electronically controlled pressure generating unit separate from the master cylinder. The vehicle braking system is operable to provide braking in a first configuration in which the electronically controlled pressure generating unit pressurizes fluid, through the master cylinder, in the first circuit, to the first wheel cylinder. In the first configuration, the electronically controlled pressure generating unit pressurizes fluid in the second circuit to the second wheel cylinder, bypassing the master cylinder.

17 Claims, 3 Drawing Sheets

(56) References Cited

U.S. PATENT DOCUMENTS

| | | |
|---|---|---|
| 9,925,964 B2 | 3/2018 | Claussen et al. |
| 10,525,959 B2 | 1/2020 | Knechtges et al. |
| 11,273,812 B2* | 3/2022 | Linhoff .................... B60T 8/26 |
| 2006/0066146 A1* | 3/2006 | Otomo ................. B60T 13/147 |
| | | 303/151 |
| 2015/0266457 A1* | 9/2015 | Johnson ................. B60T 7/042 |
| | | 303/15 |
| 2016/0193990 A1* | 7/2016 | Drumm ................ B60T 8/4077 |
| | | 701/70 |
| 2017/0015290 A1* | 1/2017 | Oosawa ................ B60T 13/146 |
| 2017/0361816 A1* | 12/2017 | Besier ................. B60T 8/1766 |
| 2018/0215366 A1* | 8/2018 | Leiber ................. B60T 13/745 |
| 2019/0016321 A1* | 1/2019 | Dinkel ................... B60T 13/62 |
| 2019/0184958 A1* | 6/2019 | Watanabe ................. B60T 8/48 |
| 2021/0122339 A1* | 4/2021 | Kuzuya .................. B60T 8/404 |
| 2021/0155215 A1* | 5/2021 | Ganzel .................. B60T 11/20 |
| 2022/0185254 A1* | 6/2022 | Nakayasu ............... B60T 8/409 |

\* cited by examiner

VEHICLE BRAKING SYSTEM AND METHOD OF OPERATING THE SAME

BACKGROUND

The present disclosure relates to vehicle braking systems.

SUMMARY

In one aspect, a vehicle braking system includes a first wheel cylinder, a second wheel cylinder, a master cylinder including a first master cylinder chamber in fluid communication with the first wheel cylinder via a first circuit and a second master cylinder chamber in fluid communication with the second wheel cylinder via a second circuit, and an electronically controlled pressure generating unit separate from the master cylinder. The vehicle braking system is operable to provide braking in a first configuration in which the electronically controlled pressure generating unit pressurizes fluid, through the master cylinder, in the first circuit, to the first wheel cylinder. In the first configuration, the electronically controlled pressure generating unit pressurizes fluid in the second circuit to the second wheel cylinder, bypassing the master cylinder.

In another aspect, a method of operating a vehicle braking system includes actuating an electronically controlled pressure generating unit, pressurizing fluid along a first fluid pressurization path defined from the electronically controlled pressure generating unit, through the master cylinder, and to a first wheel cylinder, and pressurizing fluid along a second fluid pressurization path defined from the electronically controlled pressure generating unit to a second wheel cylinder, the second path bypassing the master cylinder. The first path is pressurized concurrently with the second path.

In yet another aspect, a vehicle braking system includes a first wheel cylinder, a second wheel cylinder, a master cylinder including a first piston and a second piston, a braking input device coupled to the master cylinder, an electronically controlled pressure generating unit separate from the master cylinder, a first valve positioned between the electronically controlled pressure generating unit and the master cylinder, a second valve positioned between the master cylinder and the second wheel cylinder, and a third valve positioned between the electronically controlled pressure generating unit and the second wheel cylinder. The vehicle braking system is operable to provide braking in a first configuration in which the first valve is in an open position, the second valve is in a closed position, and the third valve is in an open position such that the vehicle braking system operates as a brake-by-wire system with direct feedback to the braking input device.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1A:
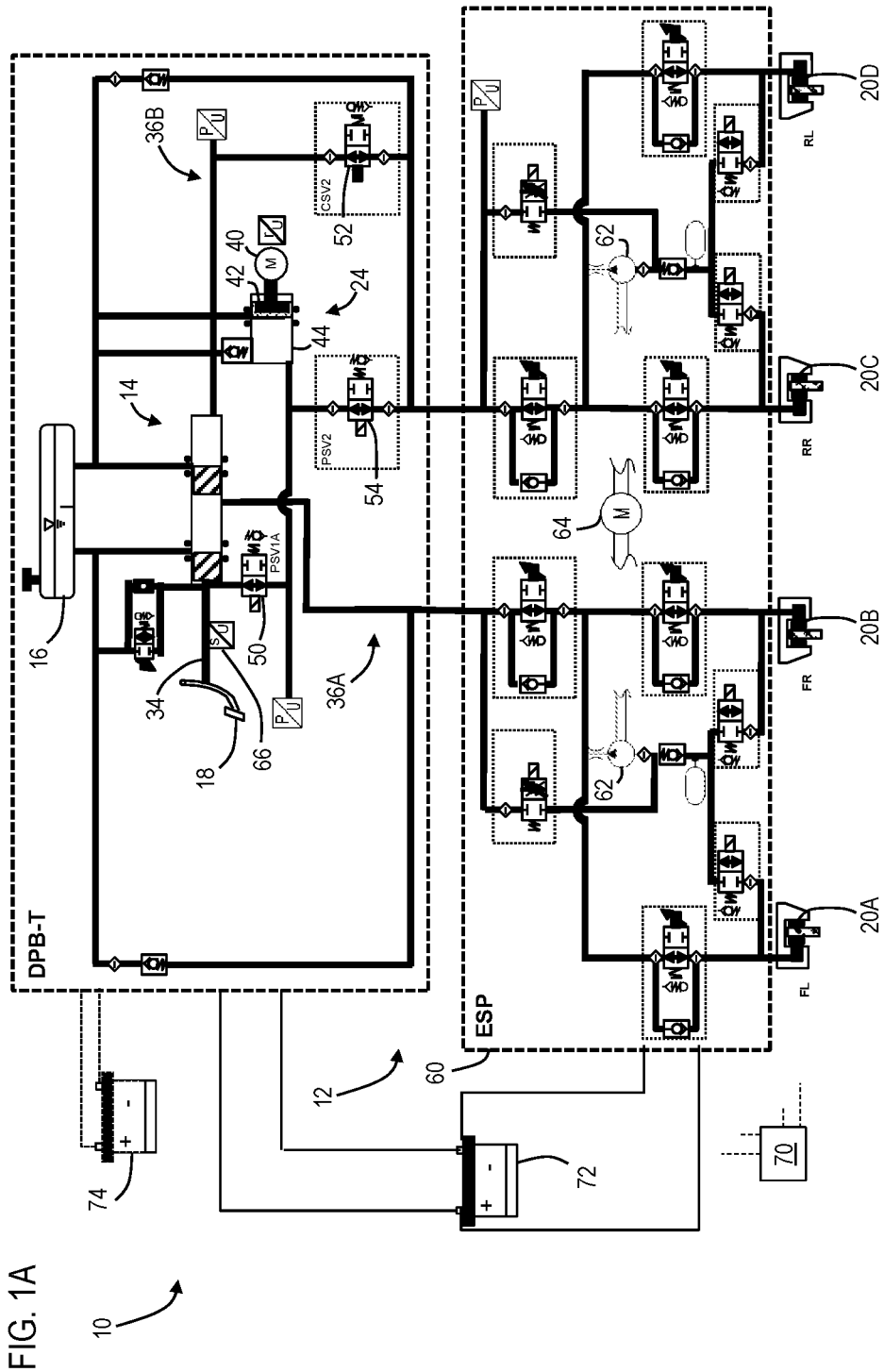
FIG. 1A is a schematic view of a vehicle braking system.

FIG. 1A illustrates a vehicle braking system 10 operable in a hybrid mode that includes brake-by-wire braking as well as concurrent push-through braking. The braking system 10 includes a braking unit 12, a fluid reservoir 16, a braking input device such as a brake pedal 18, and a plurality of wheel cylinders 20A-D (as shown, the vehicle braking system 10 includes four wheel cylinders 20A-D, each wheel cylinder 20A, 20B, 20C, 20D associated with a wheel of the vehicle) connected to the braking unit 12. The braking unit 12 pressurizes hydraulic fluid to achieve a braking force at the wheel cylinders 20 and includes a master cylinder 14 and an electronically controlled pressure generating unit 24 separate from the master cylinder 14. The master cylinder 14 (which may be boosted by a booster, not shown) and the electronically controlled pressure generating unit 24 are two distinct fluid suppliers for applying braking force through fluid pressure to the wheel cylinders 20.

Figure 1B:
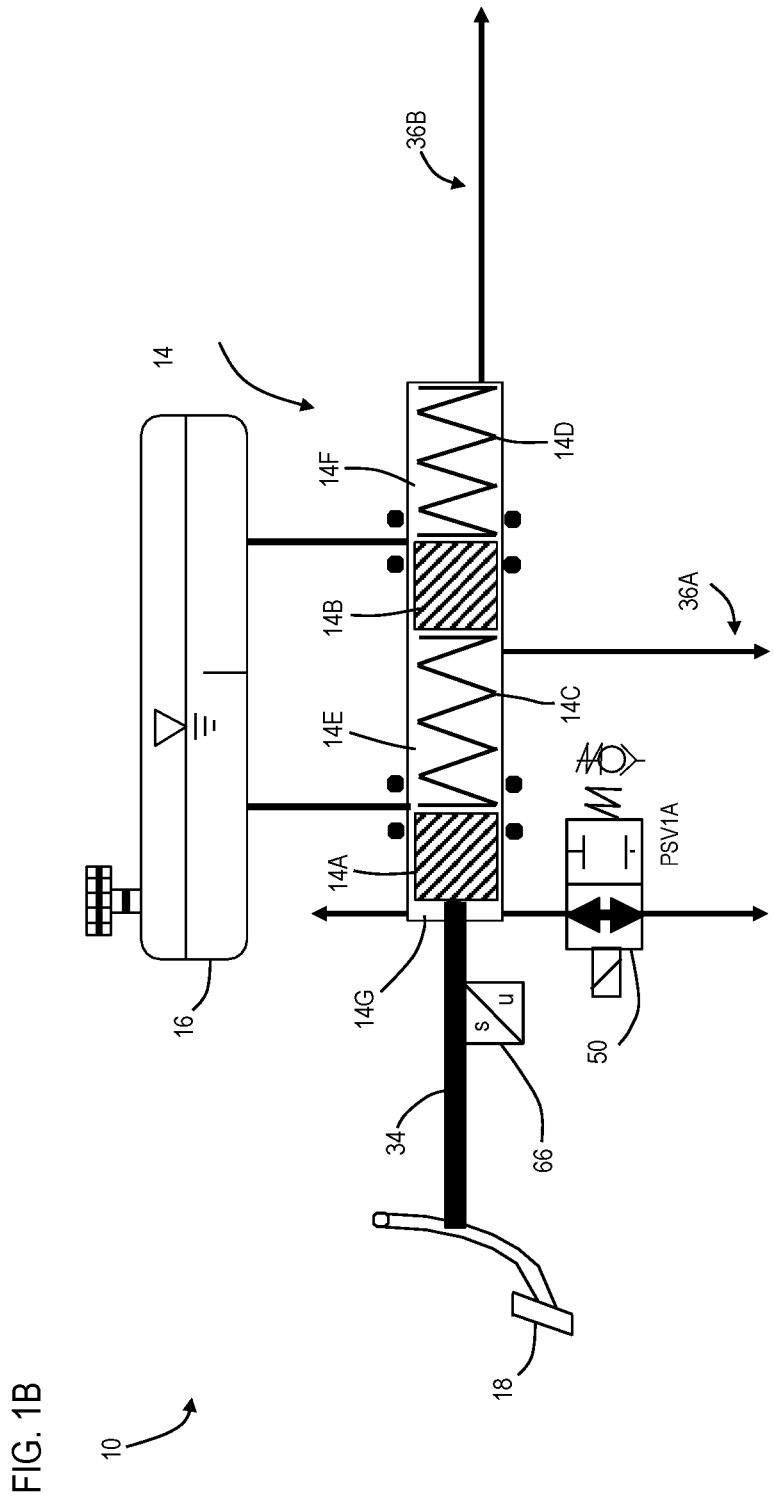
FIG. 1B is an enlarged schematic view of the master cylinder and surrounding components of the vehicle braking system of FIG. 1A.

As shown in FIG. 1B, the master cylinder 14 is a tandem master cylinder including two master cylinder pistons 14A, 14B biased toward a front of the master cylinder 14 via master cylinder return springs 14C, 14D. The pistons 14A, 14B delineate the interior of the master cylinder 14 into a first chamber 14E, a second chamber 14F, and a third chamber 14G. Each of the first and second chambers 14E, 14F of the master cylinder 14 is in selective fluid communication with a circuit 36A, 36B for one or more of the wheel cylinders 20. The third chamber 14G extends from a first axial extent of the master cylinder (adjacent the brake pedal 18) to the first piston 14A. As such, from left to right (as shown in FIG. 1B), the master cylinder 14 includes the third chamber 14G, the first piston 14A, the first chamber 14E, the second piston 14B, and the second chamber 14F. An input rod 34 connects the master cylinder 14 to the brake pedal 18. More specifically, the input rod 34 provides an input force and displacement from the brake pedal 18 to the first piston 14A. The force and displacement can, in certain embodiments, be transferred from the first piston 14A to the second piston 14B. A brake booster (not shown) may be mounted adjacent to the master cylinder 14 to modify the force applied at the brake pedal 18.

As shown, the first circuit 36A includes passages that hydraulically couple the first chamber 14E of the master cylinder 14 with a first half of the wheel cylinders and specifically the first and second wheel cylinders 20A, 20B. The second circuit 36B includes passages that hydraulically couple the second chamber 14F of the master cylinder with a second half of the wheel cylinders and specifically the third and fourth wheel cylinders 20C, 20D. In some embodiments, the circuits 36A, 36B have a front/rear split such that the separate circuits 36A, 36B provide braking to front and rear wheels separately. In other embodiments, the wheel cylinders 20A-D have a cross-split such that the first circuit 36A is associated with, for example, a front left wheel cylinder and a rear right wheel cylinder and the second circuit 36B is associated with a front right wheel cylinder and a rear left wheel cylinder.

The electronically controlled pressure generating unit 24 is selectively in communication with each of the first and second circuits 36A, 36B and includes a motor 40 and a piston 42 that is operated by the motor 40. The electronically controlled pressure generating unit 24 is separate from the master cylinder 14 and allows operation of the vehicle braking system 10 in a brake-by-wire operation. The motor 40 operates in response to a signal from a sensor 66 that indicates a desired braking operation. In operation, the motor 40 displaces the piston 42, thereby displacing the fluid from within the power-side chamber 44 of the piston 42 to the first and second circuits 36A, 36B. More specifically, as described in greater detail below, the motor displaces fluid concurrently from the power-side chamber 44 directly to the second circuit 36B and indirectly to the first circuit 36A via the master cylinder 14.

The sensor 66 may be a position or displacement sensor associated with the brake pedal 18 or input rod 34, detecting operator input to the brake pedal 18. Alternatively, the sensor 66 may be associated with an automated braking operation such as cruise control, adaptive cruise control, or an autonomous driving mode and detects a desired speed, change in speed, trailing distance, obstacle, or other environmental or operational feature that signifies a request to brake the vehicle. The motor 40 is operated electronically and moves the piston 42 to displace fluid within one or both of the circuits 36A, 36B to provide a braking force at the wheel cylinders 20A-20D.

The second braking circuit 36B includes a plurality of valves 50, 52, 54 that are separately electronically actuated between open and closed positions to modify the flow and pressurization of fluid within the second braking circuit 36B and within the first braking circuit 36A. A first valve, a linking valve 50 is positioned between the electronically controlled pressure generating unit 24 and the third chamber 14G of the master cylinder 14. In an open position, the linking valve 50 provides the output of the electronically controlled pressure generating unit 24 to the third chamber 14G of the master cylinder 14. The linking valve 50 is biased to the closed position and is actuated to an open position.

A second valve, a separation valve 52, is positioned between the second chamber 14F of the master cylinder 14 and the wheel cylinders 20C, 20D. In the open position, the pressure and displacement of the second master cylinder piston 14B is transferred to the wheel cylinders 20C, 20D. In the closed position, the master cylinder 14 is cut-off from the wheel cylinders 20C, 20D. The separation valve 52 is biased to an open position and is actuated to the closed position.

A third valve, control valve 54, is positioned between the electronically controlled pressure generating unit 24 and the wheel cylinders 20C, 20D. The control valve 54 may be an open/closed valve, optionally pulsed at different duty cycles, or could otherwise be a multi-position variable orifice valve. In the open position, the force generated by the electronically controlled pressure generating unit 24 is transferred to the wheel cylinders 20C, 20D. In the closed position, the electronically controlled pressure generating unit 24 is cut-off from the wheel cylinders 20C, 20D. The control valve 54 is biased to the closed position and is actuated to an open position.

In some embodiments, two or more of the three valves 50, 52, 54 may be combined in a single multi-position valve. As shown in FIG. 1A, the first circuit 36A lacks comparable valves. Rather, the first circuit 36A extends from the first chamber 14E of the master cylinder 14 to an electronic stability program module 60 without any intervening valves. The valve arrangement described above is associated with the second braking circuit 36B, with the first braking circuit 36A lacking a similar linking valve, separation valve, or control valve. In other embodiments, the first braking circuit 36A may include the valve arrangement (and associated fluid pathways), with the second braking circuit 36B lacking the valve arrangement.

Each of the first and second circuits 36A, 36B includes a number of valves and a pump 62 operated by a motor 64 that collectively define the electronic stability program (ESP) 60. The electronic stability program module 60 (also referred to as electronic stability control) operates based on sensor inputs to reduce skidding and is often presented to the operator as traction control and anti-lock braking, among other functions. Each of the valves 50, 52, 54 described above is separate from the electronic stability program module 60. Further, the electronic stability program module 60 is hydraulically located between the wheel cylinders 20A-D and the valves 50, 52, 54 such that the output of the master cylinder 14 and the electronically controlled pressure generating unit 24 is controlled via the valves 50, 52, 54 prior to passing through the valves associated with the electronic stability program module 60 and to the wheel cylinders 20A-D.

A controller 70 receives the inputs from the various sensors as described above (e.g., sensor 66) and provides an output to the electronically controlled valves 50, 52, 54 as well as the electronically controlled pressure generating unit 24. A battery 72 (i.e., the vehicle battery) provides the electrical current for actuating the valves 50 ,52, 54 and electronically controlled pressure generating unit 24 in response to the output from the controller 70. In some embodiments, the braking system 12 is operable in a highly autonomous vehicle, which may necessitate a second battery 74 as a backup for the battery 72.

A primary mode of operation or first configuration of the vehicle braking system 10 is a hybrid arrangement comprising master cylinder push-through braking and brake-by-wire braking. In master cylinder push-through braking the input to the master cylinder 14 is carried through to the wheel cylinders 20A-20D. In brake-by-wire braking, the pressure generation device (here the electronically controlled pressure generating unit 24) is fluidly isolated from the master cylinder 14 and provides braking that may be proportional to the input at the input device 18, but is ultimately decoupled from the input device 18 and master cylinder 14. The primary mode of operation combines these two operations to generate brake-by-wire braking while coupling the input device 18 to at least some of the wheel cylinders 20A-20B to provide actual force feedback at the input device 18 rather than simulated feedback via a pedal feel simulator, there being no pedal feel simulator in the illustrated embodiment.

In the primary mode of operation, the braking system 10 operates as follows. An operator provides an input to the brake pedal 18, thereby displacing the brake pedal 18 and the input rod 34 from a rest position to an actuated position. Movement of the input rod 34 displaces the first piston 14A against the bias of the return spring 14C, thereby pressurizing the fluid in the first circuit 36A. In the primary mode of operation, the separation valve 52 (positioned between the second chamber 14F of the master cylinder 14 is closed to fluidly isolate the master cylinder 14 from the wheel cylinders 20C, 20D in the second circuit 36B. Therefore, as the first piston 14A is displaced against the bias, the second piston 14B remains substantially rigid and unmoving, as the incompressible liquid is trapped between the second piston 14B and the closed separation valve 52. As such, the master cylinder 14 does not provide braking force to the wheel cylinders 20C, 20D of the second circuit 36B.

To provide braking to the second circuit 36B in the primary mode of operation, the electronically controlled pressure generating unit 24 is operated concurrently with the brake pedal 18 and proportional to the input at the brake pedal 18. The electronically controlled pressure generating unit 24 operates based on a signal from the controller 70, which relays the input at the brake pedal 18 to actuate the motor 40. The output of the electronically controlled pressure generating unit 24 is controlled by modifying operation of the motor 40 and/or by adjusting the position of the control valve 54. The control valve 54 is in an open position in the primary mode of operation to provide pressurized fluid from the electronically controlled pressure generating unit 24 to the wheel cylinders 20C, 20D.

The braking system 10 does not only operate as a separated hybrid arrangement with the first circuit 36A functioning as a push-through system and the second circuit 36B functioning as a brake-by-wire system. With the linking valve 50 in the open position, the output of the electronically controlled pressure generating unit 24 is routed to the third chamber 14G of the master cylinder 14. Therefore, the pressure generated by the electronically controlled pressure generating unit 24 acts upon the first piston 14A, increasing the force applied to the first circuit 36A. The braking force applied in the first circuit 36A is therefore similar to the braking force applied in the second circuit 36B.

Figure 2:
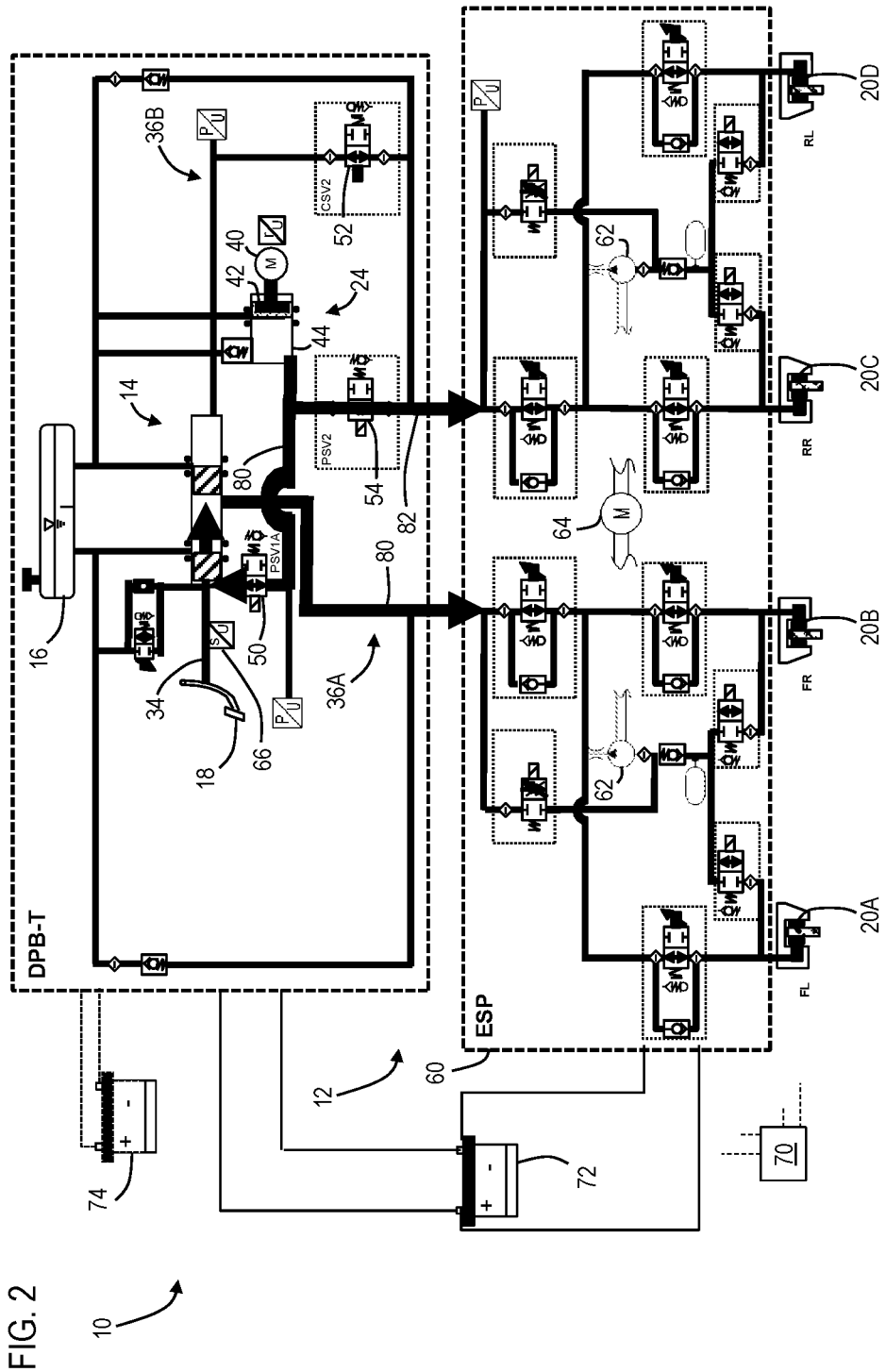
FIG. 2 is a schematic view of the vehicle braking system of FIG. 1A further illustrating first and second fluid pressurization paths.

As shown in FIG. 2, in the primary mode of operation, fluid is pressurized concurrently along two paths 80, 82, both paths originating at the same power-side chamber 44 of the electronically controlled pressure generating unit 24. A first fluid pressurization path 80 is defined from the electronically controlled pressure generating unit 24, through the master cylinder 14, and to the first and second wheel cylinders 20A, 20B through the electronic stability program module 60. As the first fluid pressurization path 80 includes the electronically controlled pressure generating unit 24, which is driven by the motor 40, it operates under brake-by-wire principles. However, as it passes through the master cylinder 14 to the wheel cylinders 20A, 20B, the input device 18 communicates with and adds to or boosts the braking force, thereby operating under push-through principles as well. A second fluid pressurization path 82 is defined from the electronically controlled pressure generating unit 24 to the third and further wheel cylinders 20C, 20D through the electronic stability program module 60. The second path bypasses the master cylinder 24 and is therefore operating fully as brake-by-wire.

While the fluid is pressurized concurrently along both paths 80, 82, in some embodiments, the actuation of the electronically controlled pressure generating unit 24 may be delayed relative to actuation of the braking input device 18. For example, if the braking input device 18 is a brake pedal, the controller 70 may delay actuation of the electronically controlled pressure generating unit 24 until the input rod 34 has travelled three millimeters, as measured by the pedal travel sensor 66. Delaying actuation of the electronically controlled pressure generating unit 24 can eliminate the need to recharge the piston 42 in certain braking situations.

The first arrangement is operable in an autonomous or automatic braking mode (based on sensor inputs as described above) in which the vehicle generates the braking without operator input. In an autonomous braking operation, the pressure applied to the first circuit may be less than otherwise applied in an operator-input braking event as the braking operation lacks operator input and the fluid pressurized by the electronically controlled pressure generating unit 24 is unable to apply a force at the diameter of the input rod 34.

With reference to FIG. 1A, a secondary mode of operation or a second configuration of the vehicle braking system 10 is a backup mode usable upon a failure or malfunction of a system component such as a motor 40, battery 72, 74, electronically controlled pressure generating unit 24, or valve. The secondary mode of operation is a pure push-through mode of operation in which the braking is provided by the vehicle operator via the input device and master cylinder. In the secondary mode of operation, the linking valve 50, separation valve 52, and control valve 54 are in their unactuated and biased positions such that the linking valve 50 is closed, the separation valve 52 is open, and the control valve 54 is closed. Upon actuation of the input device, fluid in the first and second master cylinder chambers 14E, 14F is pressurized by the first and second pistons 14A, 14B, directing the fluid through the first and second circuits 36A, 36B and to the wheel cylinders 20A-D. The braking is provided by the operator and is not supplemented by the electronically controlled pressure generating unit 24.

A tertiary mode of operation or a third configuration of the vehicle braking system 10 is a replenishment mode for refilling or recharging the electronically controlled pressure generating unit 24 if the fluid in the electronically controlled pressure generating unit 24 is depleted, which may occur, for example, in large vehicles and panic braking scenarios. In the third configuration, all three of the valves 50, 52, 54 are closed, thereby disconnecting the electronically controlled pressure generating unit 24 from the wheel cylinders 20A-20D and allowing additional fluid to refill the electronically controlled pressure generating unit 24 from the reservoir 16.

In some embodiments, the first circuit 36A may also include a separation valve (similar to separation valve 52) positioned between the first chamber 14E of the master cylinder 14 and the wheel cylinders 20A, 20B and a control valve (similar to control valve 54) positioned between the electronically controlled pressure generating unit 24 and the wheel cylinders 20A, 20B. The inclusion of separation and control valves in the first circuit 36A can eliminate pedal movement during autonomous brake applications.

Various features of the disclosure are set forth in the following claims.

The invention claimed is:
1. A vehicle braking system comprising:
a first wheel cylinder;
a second wheel cylinder;
a master cylinder including a first master cylinder chamber in fluid communication with the first wheel cylinder via a first circuit and a second master cylinder chamber in fluid communication with the second wheel cylinder via a second circuit;
a braking input device configured to receive a user input;
a sensor operable to detect the user input and generate a signal;
an electronically controlled pressure generating unit separate from the master cylinder;
a first valve located in the first circuit between the electronically controlled pressure generating unit and the master cylinder; and
a controller programmed to generate braking in a first configuration in response to the signal;
wherein the vehicle braking system is operable to provide braking in the first configuration in which the electronically controlled pressure generating unit pressurizes fluid, through the master cylinder, in the first circuit, to the first wheel cylinder;
wherein the first valve is open in the first configuration;
wherein, in the first configuration, the electronically controlled pressure generating unit pressurizes fluid in the second circuit to the second wheel cylinder, bypassing the master cylinder, wherein the user input is provided to the first wheel cylinder via the master cylinder such that the user input receives direct feedback, without any pedal feel simulator, and wherein the master cylinder further comprises a third master cylinder chamber located between the braking input device and the first master cylinder chamber, wherein the first valve is located between the electronically controlled pressure generating unit and the third master cylinder chamber.

2. The vehicle braking system of claim 1, further comprising a second valve located in the second circuit between the second master cylinder chamber and the second wheel cylinder, wherein the second valve is closed in the first configuration.

3. The vehicle braking system of claim 2, further comprising a third valve located in the second circuit between the electronically controlled pressure generating unit and the second wheel cylinder, wherein the third valve is open in the first configuration.

4. The vehicle braking system of claim 1, wherein the electronically controlled pressure generating unit assists a user-generated input force at the braking input device in the first circuit in the first configuration.

5. The vehicle braking system of claim 1, wherein the electronically controlled pressure generating unit is a motor-driven piston.

6. The vehicle braking system of claim 1, further comprising a motor-operated pump separate from the electronically controlled pressure generating unit and the master cylinder, the motor-operated pump operable to control an electronic stability program module.

7. The vehicle braking system of claim 1, wherein the master cylinder includes a first piston between the first and third master cylinder chambers and a second piston between the first and second master cylinder chambers, wherein the first piston translates in the first configuration, and wherein the second piston does not translate in the first configuration.

8. A method of operating a vehicle braking system, the method comprising:
actuating an electronically controlled pressure generating unit;
pressurizing fluid along a first fluid pressurization path defined from the electronically controlled pressure generating unit, through a master cylinder, and to a first wheel cylinder;
pressurizing fluid along a second fluid pressurization path defined from the electronically controlled pressure generating unit to a second wheel cylinder, the second path bypassing the master cylinder; and
actuating a first valve to an open position, the first valve located in the first path between the electronically controlled pressure generating unit and the master cylinder,
wherein the first path is pressurized concurrently with the second path, and
wherein the master cylinder includes a first master cylinder chamber, a second master cylinder chamber, a braking input device, and a third master cylinder chamber located between (A) the braking input device and (B) the first and second master cylinder chambers such that pressurizing fluid along the first fluid pressurization path includes pressurizing fluid from the electronically controlled pressure generating unit, through the third master cylinder chamber, and to the first wheel cylinder.

9. The method of claim 8, further comprising providing an input to the braking input device and actuating the electronically controlled pressure generating unit in response to the input.

10. The method of claim 8, further comprising actuating a second valve to a closed position, the second valve located between the master cylinder and the second wheel cylinder.

11. The method of claim 10, further comprising actuating a third valve to an open position, the third valve located in the second path between the electronically controlled pressure generating unit and the second wheel cylinder.

12. A vehicle braking system comprising:
a first wheel cylinder;
a second wheel cylinder;
a master cylinder including a first piston and a second piston;
a braking input device coupled to the master cylinder, the braking input device configured to receive a user input;
a sensor operable to detect the user input and generate a signal;
an electronically controlled pressure generating unit separate from the master cylinder;
a first valve positioned between the electronically controlled pressure generating unit and the master cylinder;
a second valve positioned between the master cylinder and the second wheel cylinder;
a third valve positioned between the electronically controlled pressure generating unit and the second wheel cylinder;
an electronic stability program module comprising a plurality of valves, wherein the first valve the second valve, and the third valve are separate from the plurality of valves; and
a controller programmed to generate braking in a first configuration in response to the signal;
wherein the vehicle braking system is operable to provide braking in a first configuration in which the first valve is in an open position, the second valve is in a closed position, and the third valve is in an open position such that the vehicle braking system operates as a brake-by-wire system with direct feedback to the braking input device, and
wherein the user input is provided to the first wheel cylinder via the master cylinder such that the user input receives direct feedback, without any pedal feel simulator.

13. The vehicle braking system of claim 12, wherein the first valve is biased to a closed position, the second valve is biased to an open position, and the third valve is biased to a closed position, and wherein the first valve is actuated to the open position, the second valve is actuated to the closed position, and the third valve is actuated to the open position in the first configuration.

14. The vehicle braking system of claim 12, wherein the master cylinder includes a first chamber between the first piston and the second piston, a second chamber adjacent the second piston, and a third chamber between the first piston and the braking input device, wherein the first valve is positioned between the electronically controlled pressure generating unit and the third chamber.

15. The vehicle braking system of claim 14, wherein the second valve is positioned between the second chamber and the second wheel cylinder.

16. The vehicle braking system of claim 12, wherein the electronically controlled pressure generating unit assists the user input generated at the braking input device in the first configuration.

17. A vehicle braking system comprising:
a first wheel cylinder;
a second wheel cylinder;
a master cylinder including a first master cylinder chamber in fluid communication with the first wheel cylinder via a first circuit and a second master cylinder chamber in fluid communication with the second wheel cylinder via a second circuit;
a braking input device configured to receive a user input
a sensor operable to detect the user input and generate a signal;
an electronically controlled pressure generating unit separate from the master cylinder;
a third master cylinder chamber located between (A) a braking input device and (B) the first and second master cylinder chambers; and
a controller programmed to generate braking in a first configuration in response to the signal;
wherein the vehicle braking system is operable to provide braking in a first configuration in which the electronically controlled pressure generating unit pressurizes fluid, through the third master cylinder chamber, in the first circuit, to the first wheel cylinder;
wherein, in the first configuration, the electronically controlled pressure generating unit pressurizes fluid in the second circuit to the second wheel cylinder, bypassing the master cylinder, and
wherein the user input is provided to the first wheel cylinder via the master cylinder such that the user input receives direct feedback, without any pedal feel simulator.

* * * * *